United States Patent
Ke et al.

(10) Patent No.: US 11,880,999 B2
(45) Date of Patent: Jan. 23, 2024

(54) PERSONALIZED SCENE IMAGE PROCESSING METHOD, APPARATUS AND STORAGE MEDIUM

(71) Applicant: TENCENT TECHNOLOGY (SHENZHEN) COMPANY LIMITED, Shenzhen (CN)

(72) Inventors: Lingjie Ke, Shenzhen (CN); Lingrui Cui, Shenzhen (CN); Zhenyang Zhao, Shenzhen (CN); Wei Dai, Shenzhen (CN); Xubin Lu, Shenzhen (CN); Xiaolong Liu, Shenzhen (CN); Qiqi Zhong, Shenzhen (CN); Xinwan Wu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 592 days.

(21) Appl. No.: 16/994,516

(22) Filed: Aug. 14, 2020

(65) Prior Publication Data
US 2020/0380724 A1 Dec. 3, 2020

Related U.S. Application Data

(63) Continuation of application No. PCT/CN2019/091303, filed on Jun. 14, 2019.

(30) Foreign Application Priority Data

Jul. 3, 2018 (CN) .......................... 201810717653.X

(51) Int. Cl.
*G06T 19/20* (2011.01)
*G06T 7/73* (2017.01)
*G06F 3/01* (2006.01)
*G06T 19/00* (2011.01)

(52) U.S. Cl.
CPC .............. *G06T 7/75* (2017.01); *G06F 3/011* (2013.01); *G06T 19/006* (2013.01); *G06T 19/20* (2013.01); *G06T 2207/30241* (2013.01)

(58) Field of Classification Search
None
See application file for complete search history.

(56) References Cited

U.S. PATENT DOCUMENTS 10,281,987 B1 * 5/2019 Yang ................... G06F 3/04815
2013/0303285 A1 11/2013 Kochi et al.
(Continued)

FOREIGN PATENT DOCUMENTS

CN  103390287 A  11/2013
CN  105068653 A  11/2015
(Continued)

OTHER PUBLICATIONS

Anonymous, Paint Draw AR 1.0, https://paint-draw-ar.soft112.com, Apr. 6, 2018 (Year: 2018).*

(Continued)

*Primary Examiner* — Steven Z Elbinger
(74) *Attorney, Agent, or Firm* — ANOVA LAW GROUP, PLLC

(57) ABSTRACT

A personalized scene image processing method is provided for a terminal device. The method includes acquiring, according to a touch event triggered in a screen region of the terminal device, a trajectory of the touch event in the screen region; generating a virtual model, according to a projection of the trajectory of the touch event in a space coordinate system; reconstructing a model view of the virtual model mapped within a field of view of the terminal device, according to a position and posture of the terminal device in the space coordinate system; and overlaying a scene image acquired by the terminal device in the position and posture with the model view to obtain a personalized scene image.

16 Claims, 10 Drawing Sheets

(56) References Cited

U.S. PATENT DOCUMENTS

2015/0363965 A1   12/2015  Wells et al.
2017/0154468 A1    6/2017  Xu
2018/0173333 A1*  6/2018  Maruoka ............... G06T 11/001

FOREIGN PATENT DOCUMENTS

| CN | 105894566 A | 8/2016 |
|---|---|---|
| CN | 106648098 A | 5/2017 |
| CN | 107204031 A | 9/2017 |

OTHER PUBLICATIONS

Ito, JP-2017033294-A, Feb. 9, 2017, includes machine translation (Year: 2017).*

The European Patent Office (EPO) The Extended European Search Report for 19829990.1 dated Aug. 30, 2021, 7 pages.

Anonymous, "Pait Draw AR," Google Play Store, Apr. 6, 2018, Retrieved from the Internet:URL: https://play.google.com/store/apps/details?id=com.vaytricks.PaintDrawAR&hl=en_US&gl=US, [retrieved on Aug. 17, 2021]. 3 pages.

Daniel Roman, "Just A Line, Google's New AR App," YouTube, Mar. 20, 2018, Retrieved from the Internet:URL: https://www.youtube.com/watch?v=1oXEWTww_68, [retrieved on Aug. 17, 2021]. 1 page.

The World Intellectual Property Organization (WIPO) International Search Report for PCT/CN2019/091303 dated Aug. 28, 2019 6 Pages (including translation).

* cited by examiner

Display a plurality of trajectory material styles, according to a received trajectory drawing request — S301

Acquire a selected target trajectory style, according to a selection operation triggered on the plurality of trajectory material styles, the virtual model being generated according to a brush style configured by the target trajectory style — S302

Project the trajectory of the touch event onto a plane, according to the position and posture of the terminal device in the space coordinate system, the plane being located in a field of view direction of the terminal device and a distance from a current position being a preset distance, and the field of view direction of the terminal device being an acquisition direction of a camera in the terminal device — S331

Generate the trajectory of the touch event into the virtual model in a projection position of the plane, according to a configured target trajectory style — S332

FIG. 10

Locate a field of view of the terminal device in the space coordinate system, according to the position of the terminal device in the space coordinate system and the acquisition direction of the camera in the terminal device — S351

Map the virtual model in the field of view to a display region of the terminal device to form the model view — S352

FIG. 11

PERSONALIZED SCENE IMAGE PROCESSING METHOD, APPARATUS AND STORAGE MEDIUM

RELATED APPLICATIONS

This application is a continuation application of PCT Patent Application No. PCT/CN2019/091303, filed on Jun. 14, 2018, which claims priority to Chinese Patent Application No. 201810717653. X, entitled "PERSONALIZED SCENE IMAGE PROCESSING METHOD AND APPARATUS", and filed with the National Intellectual Property Administration, PRC on Jul. 3, 2018, which is incorporated herein by reference in its entirety.

FIELD OF THE TECHNOLOGY

This application relates to the field of image processing technologies and, in particular, to a personalized scene image processing method and apparatus, an electronic device and a computer-readable storage medium.

BACKGROUND

Augmented reality (AR) is one of the research hotspots of many well-known domestic and foreign universities and research institutions in recent years. The AR technology is an emerging technology developed in recent years. It is a technology of calculating the position and angle of camera images in real time and adding corresponding images, videos, and 3D models. The core is to integrate virtual contents and real contents in real time to form an interaction between virtuality and reality, thereby creating a brand-new user experience.

Short videos can be captured based on the capability of an augmented reality kit (ARkit), using animation, pets, or the like as the prototype for complex 3D modeling, projecting the virtual model onto a plane in real space, such as a desktop or ground, and combining the shot real scene with the virtual model projected in space to form a personalized video. However, such approach often is costly and takes a long time to realize one functionality. The disclosed methods and systems are directed to solve one or more problems set forth above and other problems.

SUMMARY

An embodiment of the present disclosure provides a personalized scene image processing method for a terminal device. The method includes acquiring, according to a touch event triggered in a screen region of the terminal device, a trajectory of the touch event in the screen region; generating a virtual model, according to a projection of the trajectory of the touch event in a space coordinate system; reconstructing a model view of the virtual model mapped within a field of view of the terminal device, according to a position and posture of the terminal device in the space coordinate system; and overlaying a scene image acquired by the terminal device in the position and posture with the model view to obtain a personalized scene image.

Another embodiment of the present disclosure provides a terminal device for personalized scene image processing. The terminal device includes a memory storing computer program instructions, and a processor coupled to the memory. When executing the computer program instructions, the processor is configured to perform: acquiring, according to a touch event triggered in a screen region of the terminal device, a trajectory of the touch event in the screen region; generating a virtual model, according to a projection of the trajectory of the touch event in a space coordinate system; reconstructing a model view of the virtual model mapped within a field of view of the terminal device, according to a position and posture of the terminal device in the space coordinate system; and overlaying a scene image acquired by the terminal device in the position and posture with the model view to obtain a personalized scene image.

Further, another embodiment of the present disclosure further provides a non-transitory computer-readable storage medium. The non-transitory computer-readable storage medium stores computer program instructions executable by at least one processor to perform: acquiring, according to a touch event triggered in a screen region of the terminal device, a trajectory of the touch event in the screen region; generating a virtual model, according to a projection of the trajectory of the touch event in a space coordinate system; reconstructing a model view of the virtual model mapped within a field of view of the terminal device, according to a position and posture of the terminal device in the space coordinate system; and overlaying a scene image acquired by the terminal device in the position and posture with the model view to obtain a personalized scene image.

Other aspects of the present disclosure can be understood by those skilled in the art in light of the description, the claims, and the drawings of the present disclosure.

BRIEF DESCRIPTION OF THE DRAWINGS

FIG. 10 is a detailed flowchart of step 330 in; FIG. 3;

FIG. 11 is a detailed flowchart of step 350 in; FIG. 3;

DESCRIPTION OF EMBODIMENTS

The following describes embodiments of the present disclosure with reference to the accompanying drawings. Apparently, the described embodiments are merely some but not all of the embodiments of the present disclosure. A person of ordinary skill in the art may understand that the technical solutions provided in the disclosed embodiments of the present disclosure are also applicable to other technical problems. Further, unless otherwise indicated, same numbers in different accompanying drawings represent same or similar elements.

Figure 1:
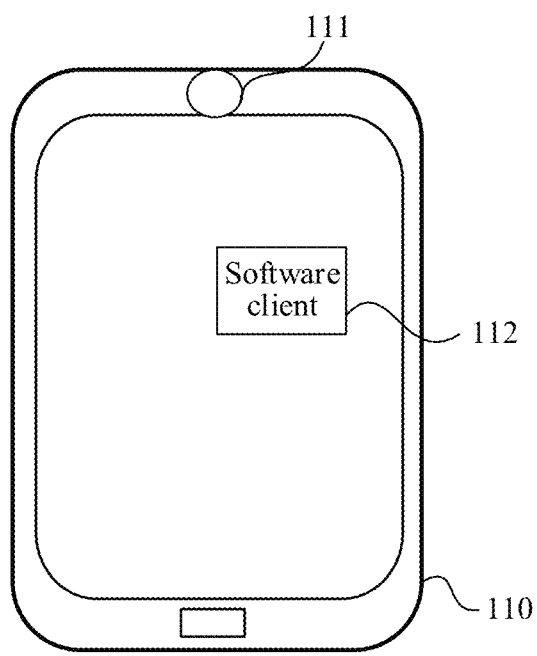
FIG. 1 is a schematic diagram of an implementation environment according to the present disclosure.

FIG. 1 is a schematic diagram of an implementation environment according to the present disclosure. As shown in FIG. 1, the implementation environment includes: a terminal device 110 with a camera 111, a software client 112 being installed in the terminal device 110; the terminal device 110 may adopt a personalized scene image processing method provided in the present disclosure by running the software client 112 to call a camera to acquire a scene image and overlay the scene image with a customized virtual model.

Figure 2:
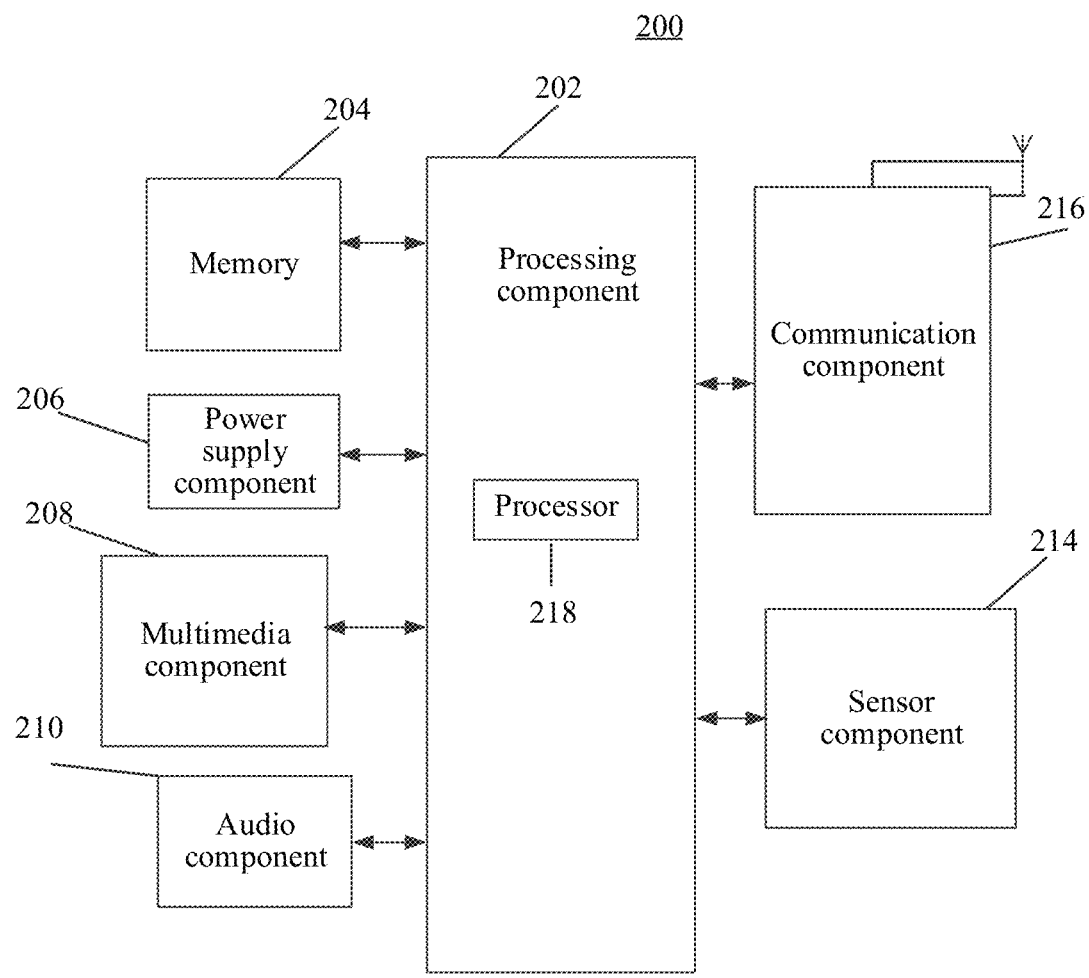
FIG. 2 is a block diagram of a computing device according to an exemplary embodiment of the present disclosure.

FIG. 2 is a block diagram of a computing device 200 according to an exemplary embodiment. For example, the computing device 200 may be a terminal device 110 in the implementation environment shown in FIG. 1. The terminal device 110 may be a mobile terminal, such as a smartphone or a tablet computer; the terminal device 110 may further be a smart home device, such as a smart camera.

Referring to FIG. 2, the computing device 200 may include one or more components of the following: a processing component 202, a memory 204, a power supply component 206, a multimedia component 208, an audio component 210, a sensor component 214, and a communication component 216.

The processing component 202 generally controls overall operations of the computing device 200, such as operations associated with display, phone calls, data communications, camera operations and recording operations. The processing component 202 may include one or more processors 218 to execute instructions, to implement all or some steps of the following method. In addition, the processing component 202 may include one or more modules, to facilitate the interaction between the processing component 202 and other components. For example, the processing component 202 may include a multimedia module, to facilitate the interaction between the multimedia component 208 and the processing component 202.

The memory 204 is configured to store various types of data to support operations of the computing device 200. Examples of the types of data include instructions of any application program or method to be operated on the computing device 200. The memory 204 may be implemented by using a volatile or non-volatile storage device of any type or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk, or an optical disc. One or more computer program modules are further stored in the memory 204. The one or more program modules are configured to be executed by one or more processors 218 to complete all or some steps of disclosed methods shown in any one of the following FIG. 3, FIG. 7, FIG. 10, and FIG. 11.

The power supply component 206 provides power to various components of the computing device 200. The power supply component 206 may include a power management system, one or more power supplies, and other components associated with generating, managing, and distributing power for the computing device 200.

The multimedia component 208 includes a screen of an output interface provided between the computing device 200 and a user. In some embodiments, the screen may include a liquid crystal display (LCD for short) and a touch panel. If the screen includes the touch panel, the screen may be implemented as a touchscreen to receive an input signal from the user. The touch panel includes one or more touch sensors to sense a touch, a slide, and a gesture on the touch panel. The touch sensor may not only sense a perimeter of the touch or slide movement, but also detect duration and pressure related to the touch or slide operation. The screen may further include an organic light emitting diode (OLED) display.

The audio component 210 is configured to output and/or input an audio signal. For example, the audio component 210 includes a microphone (MIC for short). In a case that the computing device 200 is in an operation mode, such as a call mode, a record mode, and a speech recognition mode, the microphone is configured to receive an external audio signal. The received audio signal may further be stored in the memory 204 or be sent by using the communication component 216. In some embodiments, the audio component 210 further includes a speaker, configured to output an audio signal.

The sensor component 214 includes one or more sensors, configured to provide the computing device 200 with various aspects of state assessment. For example, the sensor component 214 may detect an on/off state of the computing device 200 and a relative positioning of the component. The sensor component 214 may further detect a position change of the computing device 200 or a component of the computing device 200 and a temperature change of the computing device 200. In some embodiments, the sensor component 214 may further include a magnetic sensor, a pressure sensor or a temperature sensor.

The communication component 216 is configured to facilitate communication in a wired or wireless manner between the computing device 200 and other devices. The computing device 200 may be connected into a wireless network based on a communication standard, such as Wireless-Fidelity (WiFi). In an exemplary embodiment, the communication component 216 receives, by using a broadcast channel, a broadcast signal or broadcast-related information from an external broadcast management system. In an exemplary embodiment, the communication component 216 further includes a near field communication (NFC) module to facilitate short-distance communication. For example, the NFC module may be implemented based on a radio frequency identification (RFID for short) technology, an Infrared Data Association (IrDA for short) technology, an ultra wideband (UWB) technology, a Bluetooth technology, and another technology.

In an exemplary embodiment, the electronic device 200 may be implemented by using one or more application-specific integrated circuits (ASICs fort short), a digital signal processor, a digital signal processing devices, a programmable logic device, a field-programmable gate array, a controller, a microcontroller, a microprocessor or other electronic components, to perform the following methods.

Generally, virtual models in the related art are all pre-configured and the user can only select among the pre-configured virtual models, so that the types of virtual models available to the user are limited. If types of the configured virtual models are increased, the space occupied by the software APP and the traffic cost of downloading the software APP will increase, and this further increases the labor costs of a virtual model design.

Figure 3:
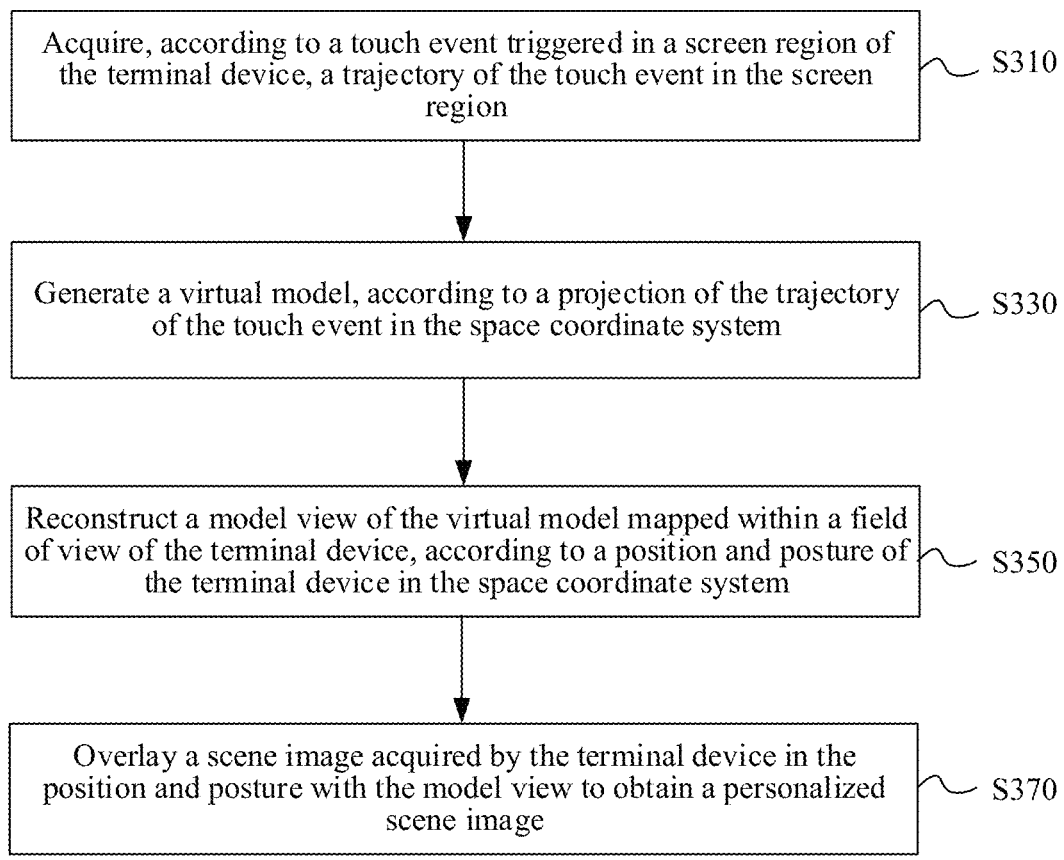
FIG. 3 is a flowchart of a personalized scene image processing method according to an exemplary embodiment of the present disclosure.

The present disclosure provides a personalized scene image processing method. FIG. 3 is a flowchart of a personalized scene image processing method according to an exemplary embodiment of the present disclosure. The personalized scene image processing method may be performed by a terminal device 110 in an implementation environment shown in FIG. 1, or may be understood to be performed by a software client 112 run by a terminal device 110, for example, a short video software APP. As shown in FIG. 3, the method may include the followings.

S310, according to a touch event triggered in a screen region of the terminal device, a trajectory of the touch event in the screen region is acquired.

The terminal device may be a mobile terminal having an image acquisition function, such as a smartphone or a tablet computer, and the terminal device may further be another smart device having the image acquisition function, such as a smart camera. The screen region is a region that is in a display interface of the terminal device and in which patterns can be drawn by touch. A user may draw the patterns in the screen region of the terminal device with a finger or a stylus. The touch event is an event that occurs when the user touches the screen with the finger or stylus in the screen region. The trajectory of the touch event is a trajectory of touch by the finger or stylus in the screen region, and includes a trigger position of the touch event. The software client receives the touch event triggered in the screen region of the terminal device and the trajectory of the touch event is formed with the continuous changes of the trigger position of the touch event.

S330, a virtual model is generated according to a projection of the trajectory of the touch event in the space coordinate system.

The space coordinate system is an absolute coordinate system and may be a world coordinate system (which uses a point in space as an origin). All the objects have corresponding position coordinates in the space coordinate system, and therefore the terminal device also has corresponding position coordinates in the space coordinate system. A projection of the trajectory of the touch event is the conversion of a pixel position (u, v) in the display interface of the terminal device into a corresponding position in the space coordinate system (x, y, and z are preset constants), according to a conversion rule between the world coordinate system, a camera coordinate system, an image coordinate system and a pixel coordinate system. That is, the pixel position triggered by the touch event in the screen region of the display interface is mapped to obtain a position point in the space coordinate system. Therefore, the trajectory of the touch event may be mapped in the space coordinate system to obtain one or more position points. Generating the virtual model is forming a three-dimensional solid figure at the position point mapped in the space coordinate system.

S350, a model view of the virtual model mapped within a field of view of the terminal device is reconstructed, according to a position and posture of the terminal device in the space coordinate system.

The terminal device has its own gyroscope and acceleration sensor and can acquire, in real time, changes of the position and posture of the terminal device. The position and posture includes position data and posture data. The position is used for representing a position of a camera in the terminal device in the space coordinate system, and the posture is used for representing an orientation of the terminal device, that is, the posture is used for representing an acquisition direction of the camera in the terminal device. The terminal device maps a position point of the virtual model in the space coordinate system (that is, the world coordinate system) to obtain a pixel position in the display interface of the terminal device, according to its real-time position and orientation in the space coordinate system and the conversion rule between the world coordinate system, the camera coordinate system, the image coordinate system and pixel coordinate system. The virtual model is filled with corresponding pixel values at the pixel position mapped by the terminal device to obtain the model view. The model view may be regarded as a picture obtained through performing, by the terminal device, image acquisition on the virtual model by using a camera configured by the terminal device in the current position and posture. Areas other than the virtual model may be regarded as transparent.

S370, a personalized scene image is obtained by overlaying a scene image acquired by the terminal device in the position and posture with the model view.

The scene image is a real-world image acquired by the camera configured by the terminal device. In the process of the movement of the terminal device, the scene image acquired by the camera in the current position and posture is overlaid with a reconstructed model view in the current position and posture. The overlapping method may be using the scene image as a background and overlaying the scene image with the model view, and therefore the virtual model may be regarded as an object fixed in the real world. In a case that the image acquisition is performed on the real world, the constructed virtual model is captured at the same time. The personalized scene image is an actual acquired scene image overlaid with the model view.

Figures 4, 5:
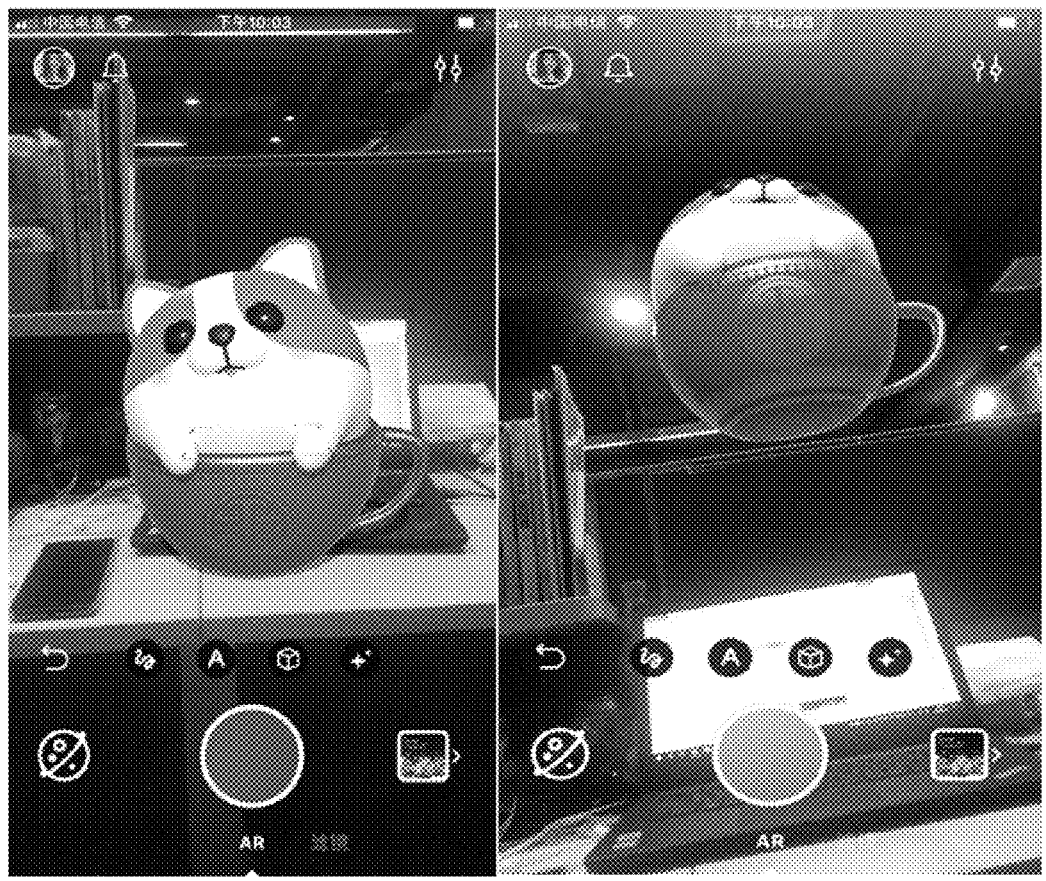
FIG. 4 is an effect diagram of displaying a 3D model in related art.
FIG. 5 is a flowchart of a personalized scene image processing method according to an exemplary embodiment of the present disclosure.

In the related art, the virtual model is pre-configured and stored in the terminal device. Downloading and storing a large quantity of virtual models occupy a relatively large space and download traffic, and construction of the large quantity of virtual models requires more labor costs. Further, the types of virtual models available to the user are limited, and consequently, needs of all users cannot be satisfied. As shown in FIG. 4, in the related art, animation and pets are used as the prototype for 3D modeling. The construction of a 3D model of a complex object requires a large quantity of human labors and material resources and the model is relatively undiversified, and therefore in the use process of a user, the interactivity is relatively poor.

Further, according to the trajectory of the triggered touch event, the trajectory of the touch event is projected into the space coordinate system to construct the virtual model, and therefore in the process of the movement of the terminal device, the scene image may be overlaid with the model view captured in the position and posture according to the real-time position and posture of the terminal device, to form a personalized scene image. Therefore, the virtual model of the present disclosure is no longer pre-configured. A customized virtual model may be formed according to a user-customized drawn pattern, thereby reducing the traffic for downloading the virtual model and the space for storing the virtual model, improving the operating efficiency of the terminal device, reducing the labor costs for designing the virtual model and enriching the types of the virtual model.

In an exemplary embodiment, as shown in FIG. 5, before S310, the personalized scene image processing method provided in the present disclosure further includes the followings.

In S301, a plurality of trajectory material styles is displayed, according to a received trajectory drawing request.

Specifically, a software client displays a virtual model drawing button in the display interface of the terminal device, receives the trajectory drawing request of triggering the virtual model drawing button from a user, thereby responding to a virtual model drawing request triggered by the user, acquiring a plurality of to-be-selected trajectory material styles, and displaying an icon corresponding to each trajectory material style. The trajectory material type is used for indicating a brush style of drawing the virtual model by touch by the user.

In S302, a target trajectory style is acquired, according to a selection triggered on the plurality of trajectory material styles, the virtual model being configured according to the target trajectory style.

Figure 6:
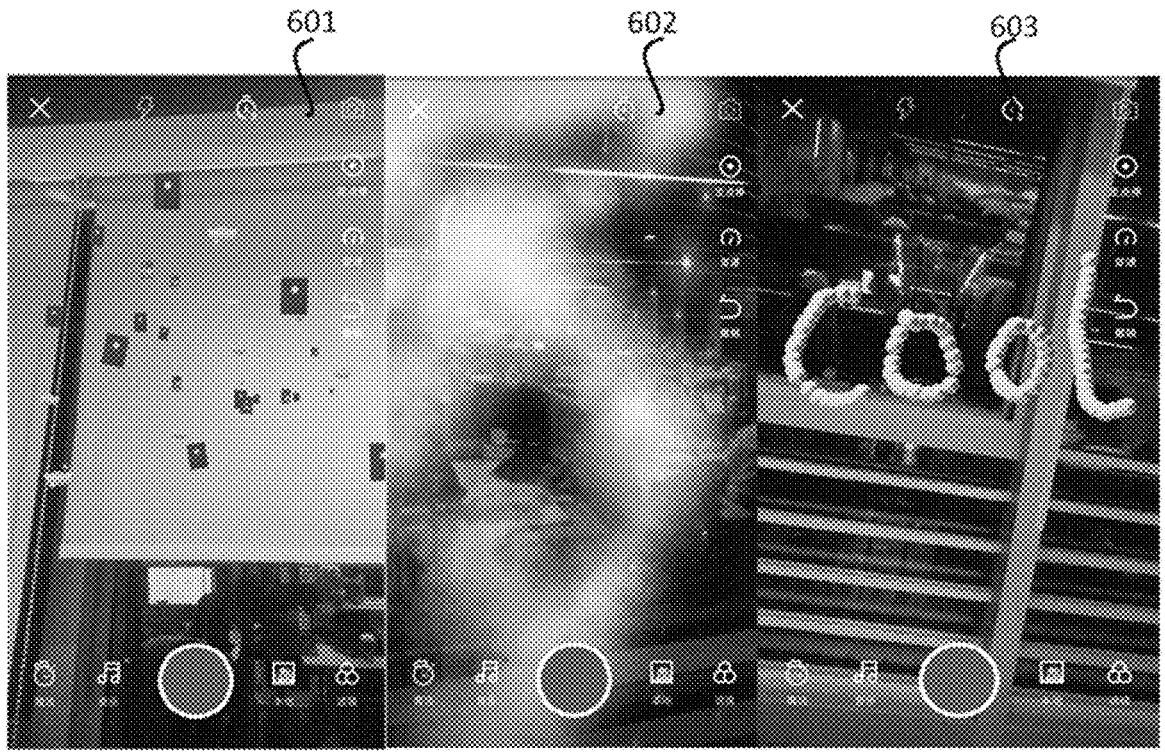
FIG. 6 is a schematic diagram of a display effect of three trajectory material styles according to an embodiment of the present disclosure.

The user may trigger to select one style from the displayed plurality of trajectory material styles. The target trajectory style is a style selected by the user from the plurality of trajectory material styles. After displaying the icons of the plurality of trajectory material styles, the software client receives a trigger instruction that the user clicks one of the icons. The software client acquires a target trajectory style selected by the user, according to a user selection that is indicated by the trigger instruction and that is triggered on the plurality of trajectory material styles. Therefore, subsequent virtual models may be generated according to a brush style configured by the target trajectory style. FIG. 6 is an effect schematic diagram of three trajectory material styles. The three trajectory material styles shown in FIG. 6 are respectively a trajectory material style 601 of "a lot of money" (as shown in the left part of FIG. 6), a trajectory material style 602 of "smoke" (as shown in the middle part of FIG. 6) and a trajectory material style 603 of "colorful brush" (as shown in the right part of FIG. 6). The user may select any trajectory material style. After receiving the selection of the user, the selected trajectory material style is used as the target trajectory style. For example, in a case that the user selects the trajectory material style 602 of "smoke", trajectory patterns are created by using a brush configured in the smoke style, as shown in the middle part of FIG. 6.

Figure 7:
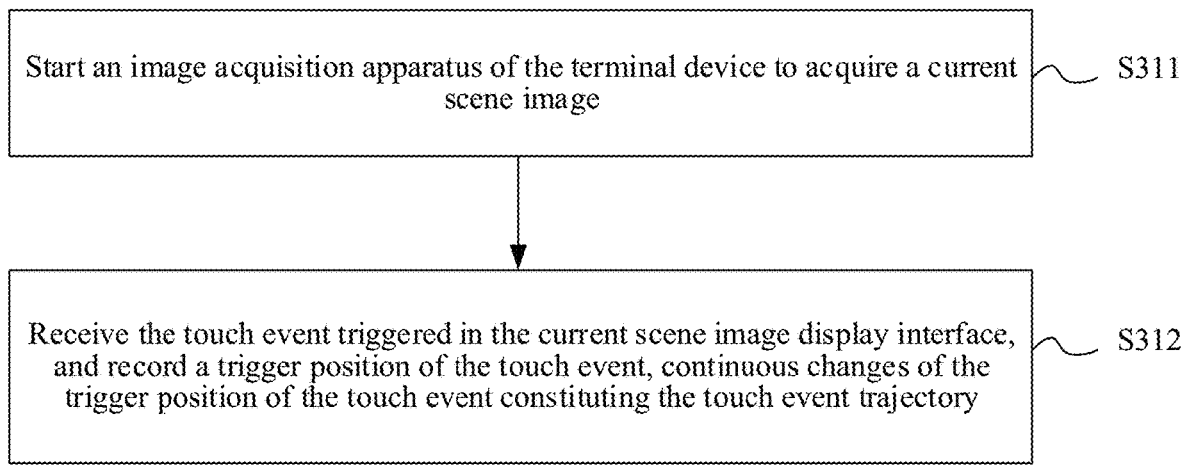
FIG. 7 is a detailed flowchart of step 310 in FIG. 3.

In an exemplary embodiment, as shown in FIG. 7, S310 specifically includes the followings.

In S311, an image acquisition apparatus of the terminal device is started to acquire a current scene image.

Specifically, the image acquisition apparatus is a camera configured by the terminal device itself. The current scene image is an image of a real scene acquired by the camera of the terminal device at the current moment. After receiving the trigger instruction of triggering a selection of the target trajectory style from the user, the software client calls the camera of the terminal device to acquire the image of the real scene.

In S312, the touch event triggered in the current image display interface is received, a trigger position of the touch event is recorded, and the trajectory of the touch event is formed by the trigger position of the touch event.

The software client displays the current scene image in the display interface of the terminal device, receives the touch event triggered in the display interface of the current scene image, and records the trigger position of the touch event. Connection lines of one or more trigger positions form a touch event trajectory.

Figure 8:
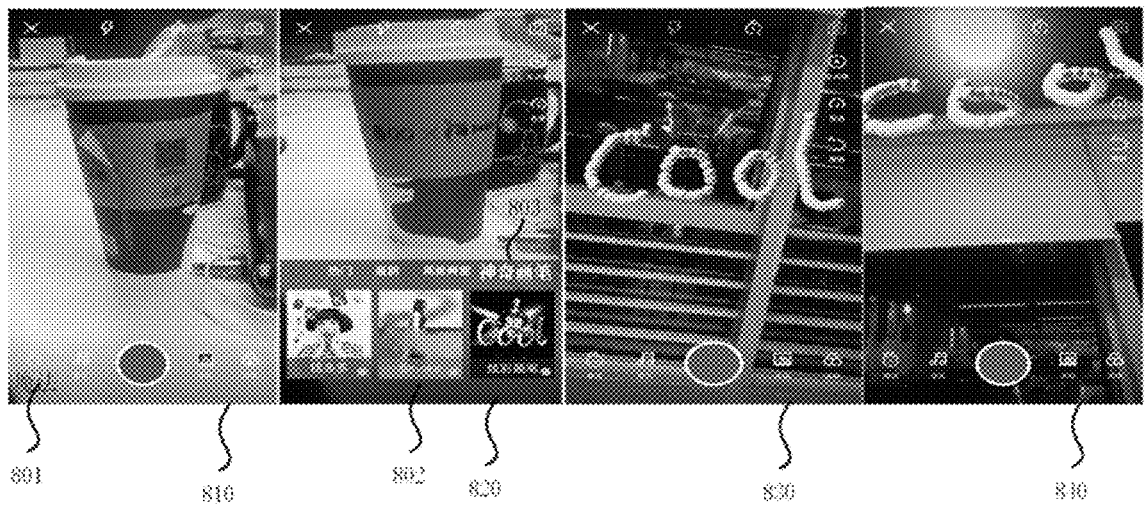
FIG. 8 is an effect schematic diagram of switching display interfaces according to an exemplary embodiment of the present disclosure.

FIG. 8 is an effect schematic diagram of switching display interfaces according to an exemplary embodiment of the present disclosure.

As shown in FIG. 8, the terminal device turns on the software client. The software client receives an instruction of clicking a "shoot" button from the user and enters a front-facing camera shooting interface 810.

The software client receives an instruction of clicking a "magic" button 801 from the user and displays an operation panel 802 corresponding to the "magic" button in the display interface. The software client receives an instruction of clicking a "magic brush" button 803 in the operation panel 802 from the user and enters a magic brush selection interface 820. The magic brush selection interface 820 displays a plurality of trajectory material styles (that is, brush types), for example, "a lot of money", "smoke", "colorful brush", and other types of brushes. The user may choose any type of brush. The selection interface further displays the prompt of "draw in a three-dimensional space" and guides the user to create the images.

After receiving the instruction of selecting any brush type from the user, the software client may receive the touch event triggered on a screen, and acquire the trajectory of the touch event. The trajectory of the touch event is projected in space to generate a solid figure. The solid figure is fixed based on space. The user adjusts a position and angle of the camera of the terminal device, and therefore pictures of the solid figure at different angles are displayed in the display interface of the terminal device (referring to interfaces 830 and 840).

Figure 9:
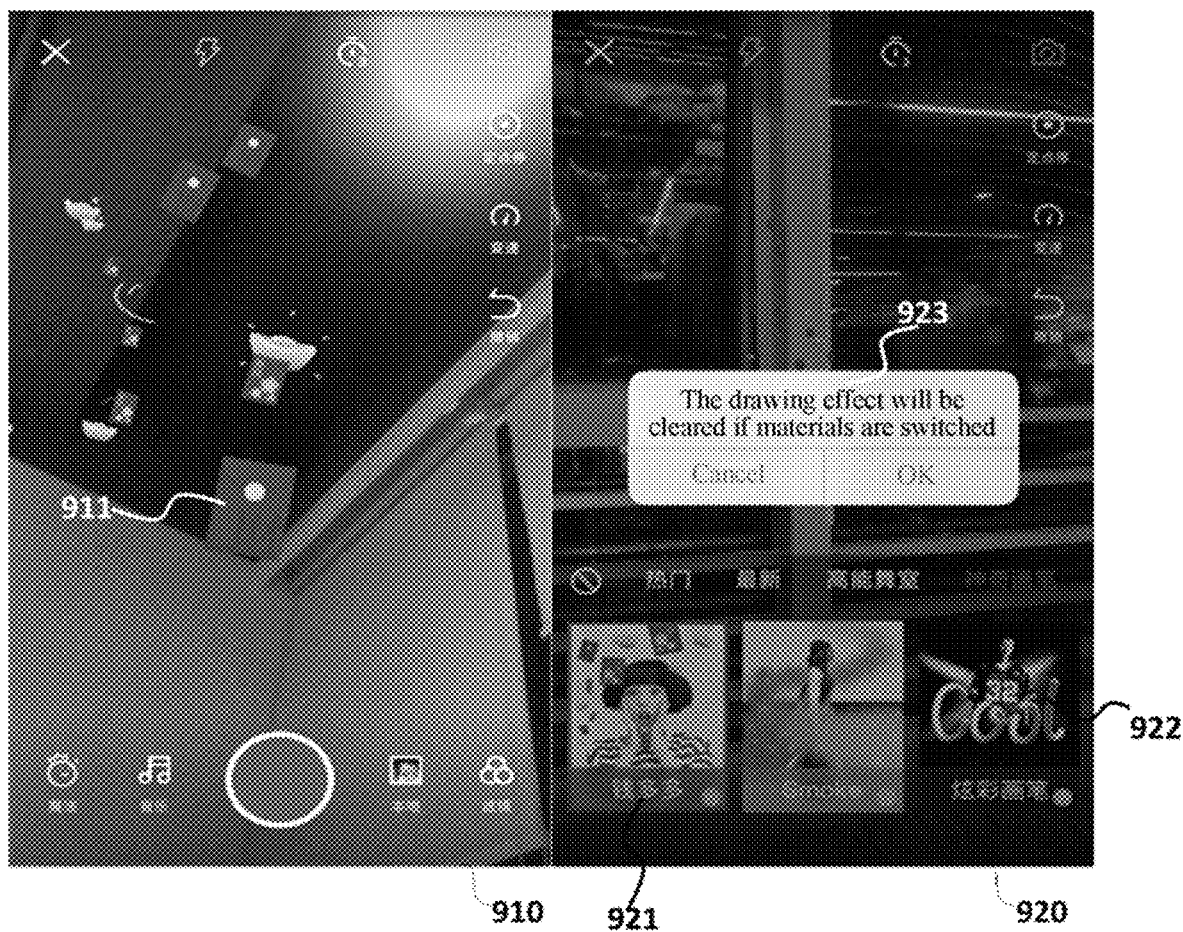
FIG. 9 is a display schematic diagram of switching brushes according to an exemplary embodiment of the present disclosure.

In an embodiment, as shown in FIG. 9, the user may draw freely in space in a manner of cooperating with an acquired scene image. Referring to an interface 910, it can be seen that a trajectory pattern 911 is drawn with the trajectory material style (that is, the brush type) of "a lot of money" in the interface 910. Because a plurality of brushes cannot be used at the same time, in a case that the user switches the brushes, the user may be prompted that the current created trajectory pattern will be cleared. Referring to an interface 920, in a case that the user switches from a brush type 921 of "a lot of money" to a brush type 922 of "colorful brush", a prompt box 923 pops up to prompt the user the trajectory pattern 911 created by the brush type 921 of "a lot of money" will be cleared.

Based on the foregoing exemplary embodiment, as shown in FIG. 10, S330 specifically includes:

In S331, the trajectory of the touch event is projected onto a plane, according to the position and posture of the terminal device in the space coordinate system. The plane is located in a field of view direction of the terminal device and a distance from a current position is a preset distance. The field of view direction of the terminal device is an acquisition direction of a camera in the terminal device.

The moment at which the touch event occurs is the moment at which a finger of the user or a stylus touches the screen. The field of view direction of the terminal device is a direction in which the camera configured by the terminal device performs the image acquisition. The position and posture includes position data and posture data. The position is used for representing a position of a camera of the terminal device in the space coordinate system. The posture is used for representing an acquisition direction of the camera in the terminal device.

Specifically, in a case that the touch event occurs, the software client converts pixel position coordinates at which the touch event occurs in the display interface from a position point in the pixel coordinate system to a position point in the real world coordinate system (i.e., finding a corresponding point in the world coordinate system based on a specified point in the pixel coordinate system, and details are not described herein again), according to the position and posture (which includes the position and the posture) of the camera in the terminal device in the space coordinate system. It is to be explained that according to the conversion rule between the world coordinate system, the camera coordinate system, the image coordinate system and pixel coordinate system, a corresponding pixel may be found in the image based on a coordinate point in the world coordinate system, but conversely, a corresponding point that is in the world coordinate system and that is found based on a pixel in the image lacks a depth value. Therefore, in the present disclosure, by presetting a depth value (that is, a preset distance), the trajectory of the touch event is projected onto a plane, which is at the preset distance from the current position, in the space coordinate system, and according to the posture of the camera, the plane needs to be located in the acquisition direction of the camera of the terminal device according to the posture of the camera. Therefore, a position point in the corresponding world coordinate system may be found according to a coordinate position of the pixel of the trajectory of the touch event in the pixel coordinate system.

In S332, the trajectory of the touch event is generated into the virtual model in a projection position of the plane, according to a configured target trajectory style.

Specifically, the plane is a plane at the preset distance from the camera and is in the image acquisition direction of the camera in the space coordinate system. The software client projects the acquired trajectory of the touch event onto the foregoing plane in the space coordinate system, and through the conversion rule between the pixel coordinate system and the world coordinate system, the projection position point of the trajectory of the touch event in the pixel coordinate system in the foregoing panel in the space coordinate system is obtained. In an embodiment, the trajectory of the touch event includes a plurality of position coordinates of pixels, and therefore the projection position includes a plurality of position points in space that correspond to the position coordinates of pixels of the trajectory of the touch event.

The target trajectory style is one of styles selected by the user from the plurality of trajectory material styles, that is, a brush type. The software client forms a solid figure indicated by the target trajectory style, according to the target trajectory style selected by the user in the projection position of the trajectory of the touch event in the space coordinate system. The solid figure generated in the projection position may be regarded as a virtual model. The virtual model may be regarded as fixed in space. In a case that the position and posture of the terminal device is adjusted, images of the virtual model at different angles may be captured.

In an exemplary embodiment, as shown in FIG. 11, S350 specifically includes:

In S351, a field of view of the terminal device in the space coordinate system is located, according to the position of the terminal device in the space coordinate system and the acquisition direction of the camera in the terminal device.

With the movement of the terminal device, a gyroscope and an acceleration sensor configured by the terminal device may acquire the position and posture of the terminal device in the space coordinate system in real time, thereby obtaining the position and the position of the camera configured by the terminal device in the space coordinate system. Locating the field of view of the terminal device in the space coordinate system refers to reconstructing the camera coordinate system according to the position of the camera and the shooting direction. An origin of the camera coordinate system is the optical center of the camera. The x-axis and the y-axis are parallel to the X-axis and Y-axis of the image. The z-axis is the optical axis of the camera, and is perpendicular to the image plane (that is, the screen display interface). An intersection point of the optical axis and the image plane is the origin of the image coordinate system. The formed rectangular coordinate system is the camera coordinate system. The origin of the pixel coordinate system is in the upper left corner of the image (the screen display interface).

In S352, the virtual model in the field of view is mapped to a display region of the terminal device to form the model view.

Specifically, a space position point of the constructed virtual model in the world coordinate system is converted into position coordinates of the pixel in the pixel coordinate system, according to the conversion rule between the world coordinate system, the camera coordinate system, the image coordinate system and the pixel coordinate system. Due to the limited display region of the terminal device, according to the converted position coordinates of the pixel, pixel values consistent with the corresponding position points of the virtual model are filled in the position coordinates of the corresponding pixel in the display region of the terminal device, thereby obtaining patterns mapped by the virtual model in the display region of the terminal device, that is, the model view.

In an exemplary embodiment, S370 specifically includes: using a scene image acquired by the terminal device in the position and posture as a background, and overlaying the scene image with the model view to obtain the personalized scene image.

Specifically, for the scene image acquired by the terminal device in a position and posture and the model view reconstructed in the position and posture, the software client uses the scene image as the background, and overlays the scene image with the pattern mapped by the virtual model to obtain the personalized scene image.

In an exemplary embodiment, S370 specifically includes: overlaying, frame by frame, an image sequence acquired by the terminal device in the position and posture with the model view to obtain a personalized scene video.

A video recording function may be started to acquire the image sequence. In a case that the image sequence acquisition is performed, for the position and posture of the terminal device when each frame of image is acquired, the acquired image is overlaid with the model view in the position and posture, and by overlaying, frame by frame, the acquired image scene with the model view in the current position and posture, a personalized scene video may be obtained.

Figure 12:
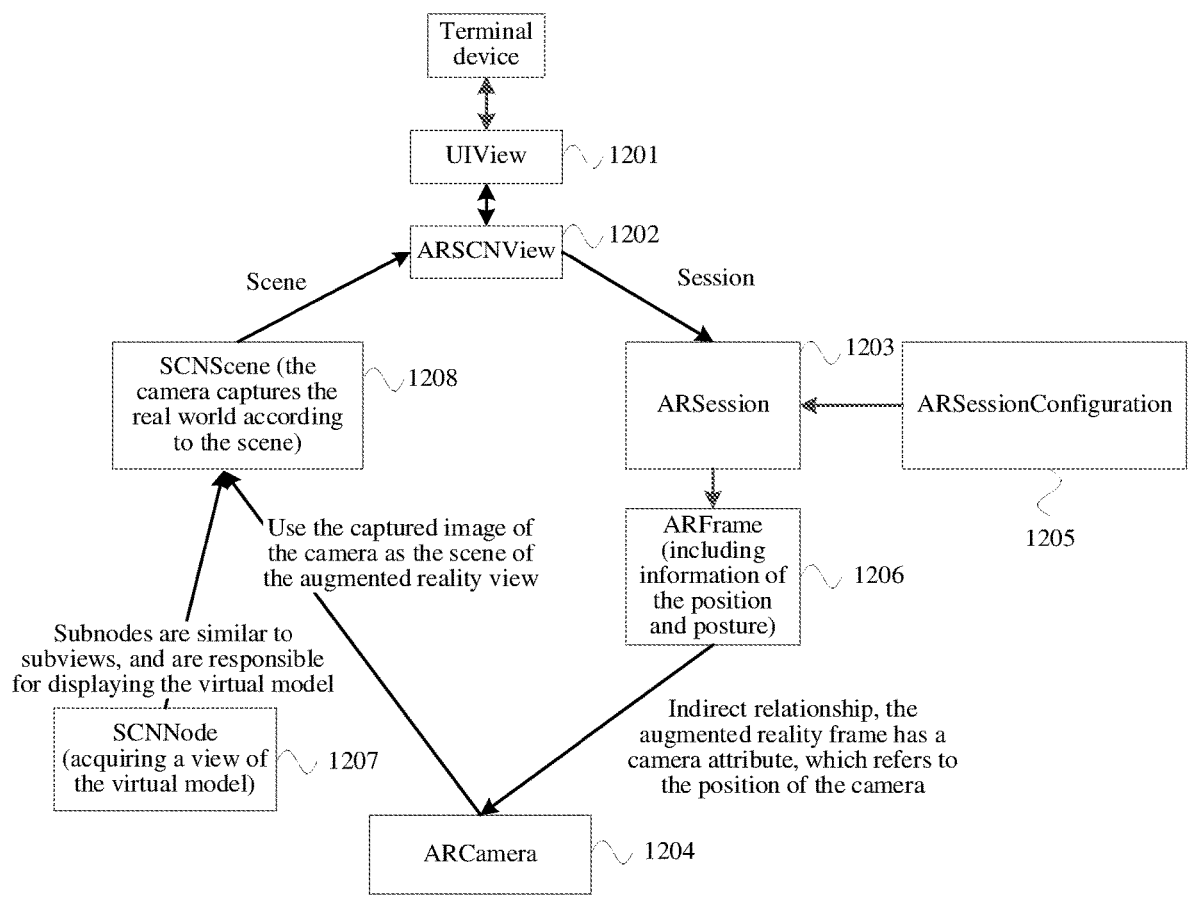
FIG. 12 is a schematic architectural diagram of an ARKit framework.

In an embodiment, the personalized scene image processing method provided in the present disclosure may be implemented based on the ARKit framework. The ARKit provides two virtual augmented reality views, including a 3D effect scene image and a 2D effect scene image. FIG. 12 is a schematic architectural diagram of an ARKit framework. As shown in FIG. 12, a user interface view (UIView) 1201 is used to display a view in a display interface of a terminal device. An augmented reality view (ARSCNView) 1202 is used to display a 3D scene. The 3D scene is composed of real-world images captured by a camera. The ARSCNView is merely a view container that is used to manage an augmented reality session (ARSession) 1203. In a complete virtual augmented reality experience, the ARKit framework is only responsible for transforming the real world picture into a 3D scene. The process of transformation is mainly divided into two links: an augmented reality camera (AR-Camera) 1204 is responsible for capturing a camera picture as a background view, the ARSession is responsible for building the 3D scene and at last, the ARSCNView displays the 3D scene.

The ARSession serves as a communication bridge between the ARCamera and the ARSCNView. The main participants of building the communication bridge are the following two: an ARSessionConfiguration 1205 and an augmented reality frame (ARFrame) 1206. The main purpose of the ARSessionConfiguration is to track the position and direction of the camera in 3D world and capture some characteristic scenes (such as plane capture), that is, detect the surface of the real world seen by the device camera. The movement, rotation and even rolling of the terminal device are detected mainly by calling the sensor of the terminal device. The ARFrame includes relevant information such as pictures captured by the camera and the camera position. An SCNNode 1207 acquires a view of the virtual model drawn by the user. An SCNScene type 1208 overlays the view with the image taken by the camera to form the personalized scene image.

Figure 13:
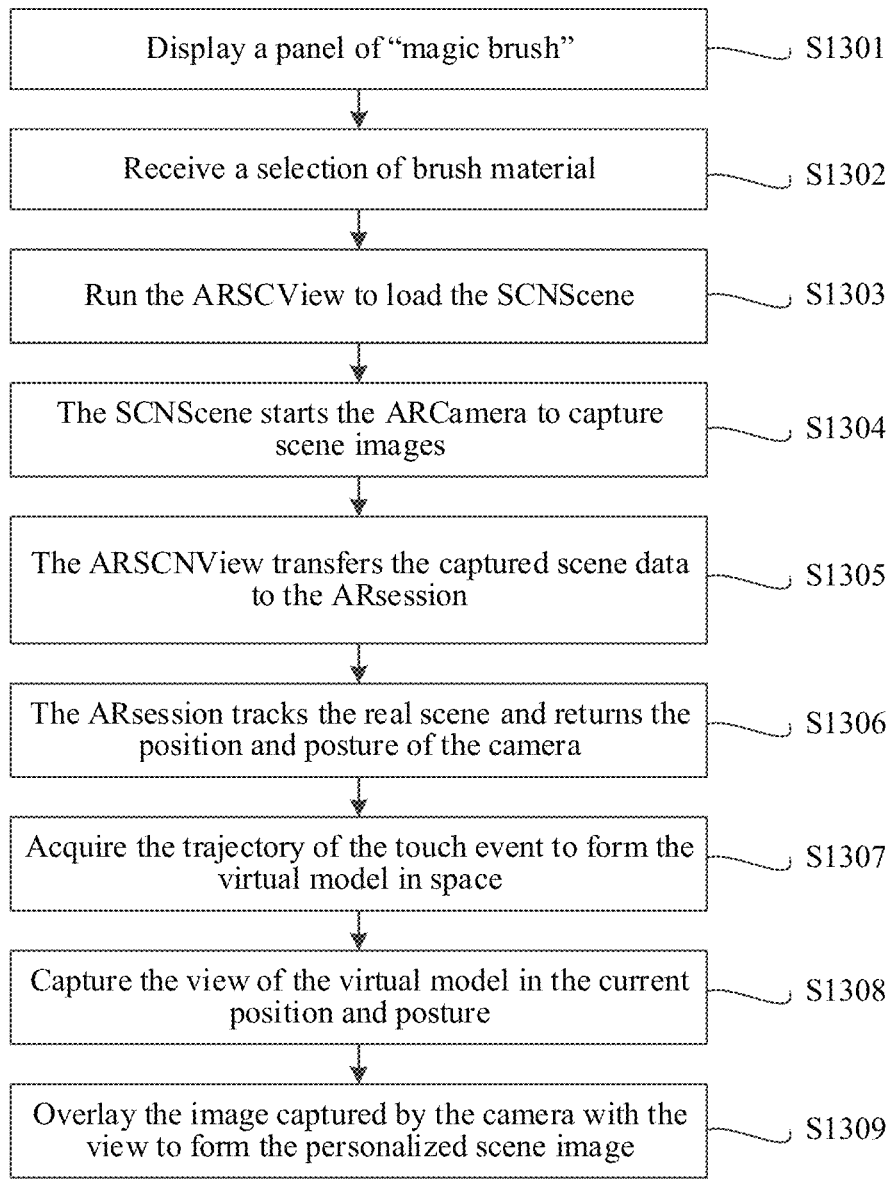
FIG. 13 is a schematic flowchart of a implementation process based on an ARKit framework according to an embodiment of the present disclosure.

FIG. 13 is a schematic flowchart of implementing the present disclosure based on the ARKit framework. As shown in FIG. 13, in S1301, the software client receives the user triggering a label of "magic brush" and displays the panel corresponding to the label of "magic brush". The panel displays a plurality of brush styles.

In S1302, the user may select one of the displayed various brush styles, and the software client receives a request of selecting the specified brush style in the panel from the user.

In S1303, the software client responds to the request of running the ARSCNView to load the scene SCNScene.

In S1304, the SCNScene starts the camera ARCamera to start to capture scene images.

In S1305, the software client runs the ARSCNView to transfer the captured scene data to the ARsession.

In S1306, the software client runs the ARsession. The ARsession tracks the position and posture of the camera in real time by managing the ARsessionConfiguration, and returns the ARFame (which includes information such as scene images and position and posture).

In S1307, the trajectory of the touch event drawn by the user is acquired and is projected in space to form the virtual model. The ARsessionConfiguration tracks the position and posture of the camera in real time to determine the real position of the virtual model relative to the camera in space.

In S1308, the software client run the SCNNode to capture the view of the virtual model in the current position and posture.

In S1309, the software client runs the SCNScene to overlay the image captured by the camera in the current position and posture with the view to form the personalized scene image, and displays the personalized scene image in the terminal device by using the UIView.

If the user chooses to switch the brush types, a pop-up window is displayed to prompt the user whether to clear the current effect.

The following is an apparatus embodiment of the present disclosure, and the apparatus embodiment may be used for performing the embodiment of the personalized scene image processing method performed by the software client 110. For details not disclosed in the apparatus embodiment of the present disclosure, refer to the embodiment of the personalized scene image processing method of the present disclosure.

Figure 14:
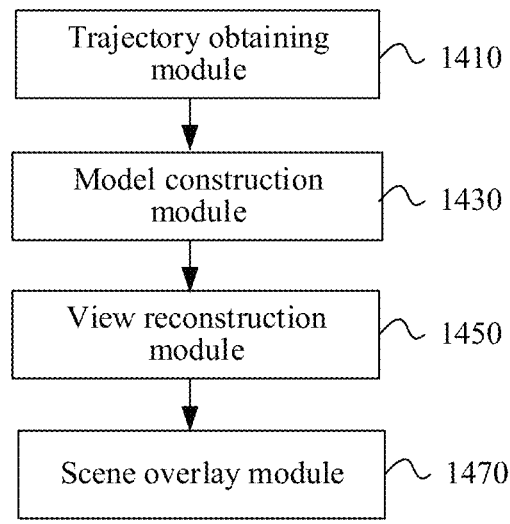
FIG. 14 is a block diagram of a personalized scene image processing apparatus according to an exemplary embodiment of the present disclosure.

FIG. 14 is a block diagram of a personalized scene image processing apparatus according to an exemplary embodiment. The personalized scene image processing apparatus may be applied to a terminal device 110 in an implementation environment shown in FIG. 1, to perform all or some of the steps in the personalized scene image processing method shown in any one of FIG. 3, FIG. 7, FIG. 10, and FIG. 11. As shown in FIG. 14, the apparatus includes but not limited to: a trajectory obtaining module 1410, a model construction module 1430, a view reconstruction module 1450 and a scene overlay module 1470.

The trajectory obtaining module 1410 is configured to acquire, according to a touch event triggered in a screen region of a terminal device, a trajectory of the touch event in the screen region.

The model construction module 1430 is configured to generate a virtual model, according to a projection of the trajectory of the touch event in a space coordinate system.

The view reconstruction module 1450 is configured to reconstruct a model view of the virtual model mapped within a field of view of the terminal device, according to a position and posture of the terminal device in the space coordinate system.

The scene overlay module 1470 is configured to overlay a scene image acquired by the terminal device in the position and posture with the model view to obtain a personalized scene image.

For details about the implementation processes of the functions and effects of the modules in the foregoing apparatus, refer to the implementation process of the corresponding steps in the personalized scene image processing method. Details are not described herein again.

The trajectory obtaining module 1410, for example, may be a physical structural sensor component 214 in FIG. 2.

The model construction module 1430, the view reconstruction module 1450, and the scene overlay module 1470 may further be functional modules, which are configured to perform corresponding steps in the foregoing personalized scene image processing method. It is to be understood that the modules may be implemented by hardware, software or a combination thereof. In a case that the modules are implemented by means of hardware, the modules may be implemented as one or more hardware modules, such as one or more application-specific integrated circuits. In a case that the modules are implemented by means of software, the modules may be implemented as one or more computer programs executed in one or more processors, such as a program stored in a memory 204 executed by a processor 218 in FIG. 2.

In an exemplary embodiment, the personalized scene image processing apparatus further includes: a style obtaining module, configured to display a plurality of trajectory material styles according to a received trajectory drawing request; and a style selection module, configured to acquire a selected target trajectory style according to a selection triggered on the plurality of trajectory material styles, the virtual model being configured according to the target trajectory style.

Figure 15:
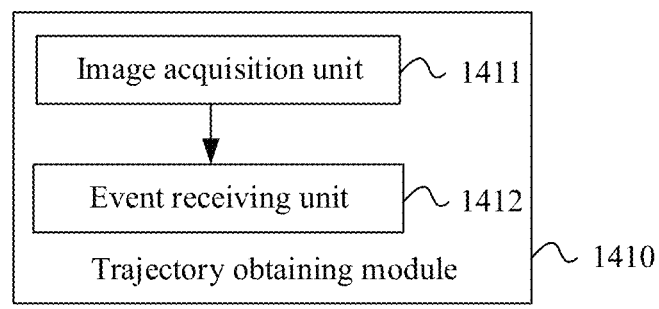
FIG. 15 is a detailed block diagram of a trajectory obtaining module in FIG. 14.

In an exemplary embodiment, as shown in FIG. 15, the trajectory obtaining module 1410 includes: an image acquisition unit 1411, configured to start an image acquisition apparatus of the terminal device to acquire a current scene image; and an event receiving unit 1412, configured to receive the touch event triggered in a current scene image display interface, and record a trigger position of the touch event, continuous changes of the trigger position of the touch event constituting the trajectory of the touch event.

Figure 16:
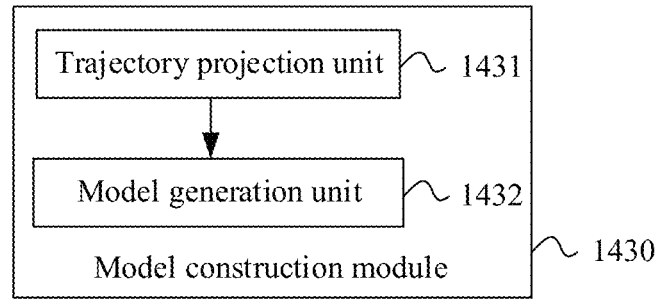
FIG. 16 is a detailed block diagram of a model construction module in FIG. 14.

In an exemplary embodiment, as shown in FIG. 16, the model construction module 1430 includes: a trajectory projection unit 1431, configured to project the trajectory of the touch event onto a plane according to the position and posture of the terminal device in the space coordinate system, the plane being located in a field of view direction of the terminal device and a distance between the plane and the current position of the terminal device being a preset distance, the position and posture including the position of the terminal device in the space coordinate system and an acquisition direction of the camera in the terminal device, and the field of view direction being the acquisition direction of the camera in the terminal device; and a model generation unit 1432, configured to generate the virtual model from the trajectory of the touch event in a projection position of the plane, according to a configured target trajectory style.

Figure 17:
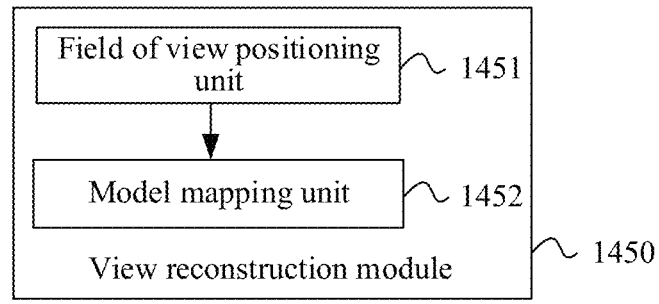
FIG. 17 is a detailed block diagram of a view reconstruction module in FIG. 14.

In an exemplary embodiment, as shown in FIG. 17, the view reconstruction module 1450 includes: a field of view positioning unit 1451, configured to locate the field of view of the terminal device in the space coordinate system, according to the position of the terminal device in the space coordinate system and the acquisition direction of the camera in the terminal device; and a model mapping unit 1452, configured to map the virtual model within the field of view to a display region of the terminal device to form the model view.

In an exemplary embodiment, the scene overlay module 1470 includes: a view overlay unit, configured to use a scene image acquired by the terminal device in the position and posture as a background, and overlay the scene image with the model view to obtain the personalized scene image.

In an exemplary embodiment, the scene overlay module 1470 is further configured to: overlay, frame by frame, an image sequence acquired by the terminal device in the position and posture with the model view to obtain a personalized scene video.

In some embodiments, the present disclosure further provides an electronic device. The electronic device may be applied to a terminal device 110 in an implementation environment shown in FIG. 1, to perform all or some of the steps in the personalized scene image processing method shown in any one of FIG. 3, FIG. 7, FIG. 10, and FIG. 11. The electronic device includes: a processor; and a memory, configured to store instructions that can be executed by the processor; the processor being configured to perform the personalized scene image processing method of the foregoing exemplary embodiment.

A specific implementation of operations performed by the processor of the electronic device in this embodiment is described in detail in the embodiments of the personalized scene image processing method, and details are not described herein.

In an exemplary embodiment, a storage medium is further provided. The storage medium is a computer-readable storage medium. For example, the storage medium may be a transitory or non-transitory computer-readable storage medium including instructions. The storage medium is, for example, a memory 204 including instructions. The storage medium stores a computer program. The computer program may be executed by a processor 218 of a computing device 200, to complete the personalized scene image processing method.

It is to be understood that the present disclosure is not limited to the precise structures described above and shown in the accompanying drawings, and various modifications and changes can be made without departing from the scope of the present disclosure. The scope of the present disclosure is subject to the appended claims.

What is claimed is:

1. A personalized scene image processing method for a terminal device, comprising:
    starting an image acquisition apparatus of the terminal device to acquire a current scene image;
    displaying a plurality of trajectory material styles, according to a received trajectory drawing request;
    obtaining a target trajectory style, according to a selection operation triggered on the plurality of trajectory material styles;
    receiving a touch event triggered in a screen region of the terminal device, and recording a trigger position of the touch event to acquire a trajectory of the touch event in the screen region, wherein the touch event is triggered in the interface that displays the current scene image, and continuous changes of the trigger position of the touch event constituting the trajectory of the touch event;
    generating a virtual model, according to a three-dimensional brush style configured by the target trajectory material style and a projection of the trajectory of the touch event in a space coordinate system;
    reconstructing a model view of the virtual model mapped within a field of view of the terminal device, according to a position and posture of the terminal device in the space coordinate system;
    overlaying a scene image acquired by the terminal device in the position and posture with the model view to obtain a personalized scene image;
    after displaying the personalized scene image, receiving a trajectory material style switching request according to a selection operation triggered on one of the plurality of trajectory material styles other than the previously selected target trajectory material style; and
    stopping displaying the model view according to the trajectory material style switching request, and displaying the current scene image.

2. The method according to claim 1, further comprising:
    in response to the trajectory material style switching request, displaying a prompt message about clearing a view corresponding to the previously selected target trajectory material style.

3. The method according to claim 1, wherein the position and posture comprise a position of the terminal device in the space coordinate system and an acquisition direction of a camera in the terminal device; and
    the generating a virtual model, according to a projection of the trajectory of the touch event in a space coordinate system comprises:
    projecting the trajectory of the touch event onto a plane according to the position of the terminal device in the space coordinate system and the acquisition direction of the camera in the terminal device, the plane being located in the acquisition direction of the camera in the terminal device, and a distance from a current position of the terminal device being a preset distance; and
    generating the virtual model from the trajectory of the touch event in a projection position of the plane, according to a configured target trajectory style.

4. The method according to claim 3, wherein the reconstructing a model view of the virtual model mapped within a field of view of the terminal device, according to a position and posture of the terminal device in the space coordinate system comprises:
   reconstructing the field of view of the terminal device in the space coordinate system, according to the position of the terminal device in the space coordinate system and the acquisition direction of the camera in the terminal device; and
   mapping the virtual model within the field of view to a display region of the terminal device to obtain the model view.

5. The method according to claim 1, wherein the overlaying a scene image acquired by the terminal device in the position and posture with the model view to obtain a personalized scene image comprises:
   using a scene image acquired by the terminal device in the position and posture as a background, and overlaying the scene with the model view to obtain the personalized scene image.

6. The method according to claim 1, wherein the overlaying a scene image acquired by the terminal device in the position and posture with the model view to obtain a personalized scene image comprises:
   overlaying, frame by frame, an image sequence acquired by the terminal device in the position and posture with the model view to obtain a personalized scene video.

7. A terminal device for personalized scene image processing, comprising:
   at least one memory storing computer program instructions; and
   at least one processor coupled to the at least one memory and, when executing the computer program instructions, configured to perform:
   starting an image acquisition apparatus of the terminal device to acquire a current scene image;
   displaying a plurality of trajectory material styles, according to a received trajectory drawing request;
   obtaining a target trajectory style, according to a selection operation triggered on the plurality of trajectory material styles;
   receiving a touch event triggered in a screen region of the terminal device, and recording a trigger position of the touch event to acquire a trajectory of the touch event in the screen region, wherein the touch event is triggered in the interface that displays the current scene image, and continuous changes of the trigger position of the touch event constituting the trajectory of the touch event;
   generating a virtual model, according to a three-dimensional brush style configured by the target trajectory material style and a projection of the trajectory of the touch event in a space coordinate system;
   reconstructing a model view of the virtual model mapped within a field of view of the terminal device, according to a position and posture of the terminal device in the space coordinate system;
   overlaying a scene image acquired by the terminal device in the position and posture with the model view to obtain a personalized scene image;
   after displaying the personalized scene image, receiving a trajectory material style switching request according to a selection operation triggered on one of the plurality of trajectory material styles other than the previously selected target trajectory material style; and
   stopping displaying the model view according to the trajectory material style switching request, and displaying the current scene image.

8. The terminal device according to claim 7, wherein the position and posture comprise a position of the terminal device in the space coordinate system and an acquisition direction of a camera in the terminal device; and
   the generating a virtual model, according to a projection of the trajectory of the touch event in a space coordinate system comprises:
   projecting the trajectory of the touch event onto a plane according to the position of the terminal device in the space coordinate system and the acquisition direction of the camera in the terminal device, the plane being located in the acquisition direction of the camera in the terminal device, and a distance from a current position of the terminal device being a preset distance; and
   generating the virtual model from the trajectory of the touch event in a projection position of the plane, according to a configured target trajectory style.

9. The terminal device according to claim 8, wherein the reconstructing a model view of the virtual model mapped within a field of view of the terminal device, according to a position and posture of the terminal device in the space coordinate system comprises:
   reconstructing the field of view of the terminal device in the space coordinate system, according to the position of the terminal device in the space coordinate system and the acquisition direction of the camera in the terminal device; and
   mapping the virtual model within the field of view to a display region of the terminal device to obtain the model view.

10. The terminal device according to claim 7, wherein the overlaying a scene image acquired by the terminal device in the position and posture with the model view to obtain a personalized scene image comprises:
   using a scene image acquired by the terminal device in the position and posture as a background, and overlaying the scene with the model view to obtain the personalized scene image.

11. The terminal device according to claim 7, wherein the overlaying a scene image acquired by the terminal device in the position and posture with the model view to obtain a personalized scene image comprises:
   overlaying, frame by frame, an image sequence acquired by the terminal device in the position and posture with the model view to obtain a personalized scene video.

12. A non-transitory computer-readable storage medium storing computer program instructions executable by at least one processor to perform:
   starting an image acquisition apparatus of the terminal device to acquire a current scene image;
   displaying a plurality of trajectory material styles, according to a received trajectory drawing request;
   obtaining a target trajectory style, according to a selection operation triggered on the plurality of trajectory material styles;
   receiving a touch event triggered in a screen region of the terminal device, and recording a trigger position of the touch event to acquire a trajectory of the touch event in the screen region, wherein the touch event is triggered in the interface that displays the current scene image, and continuous changes of the trigger position of the touch event constituting the trajectory of the touch event;
   generating a virtual model, according to a three-dimensional brush style configured by the target trajectory material style and a projection of the trajectory of the touch event in a space coordinate system;

reconstructing a model view of the virtual model mapped within a field of view of the terminal device, according to a position and posture of the terminal device in the space coordinate system;
overlaying a scene image acquired by the terminal device in the position and posture with the model view to obtain a personalized scene image;
after displaying the personalized scene image, receiving a trajectory material style switching request according to a selection operation triggered on one of the plurality of trajectory material styles other than the previously selected target trajectory material style; and
stopping displaying the model view according to the trajectory material style switching request, and displaying the current scene image.

13. The non-transitory computer-readable storage medium according to claim 12, wherein before the acquiring, according to a touch event triggered in a screen region of the terminal device, a trajectory of the touch event in the screen region, the processor further performs:
starting an image acquisition apparatus of the terminal device to acquire a current scene image; and
the acquiring, according to a touch event triggered in a screen region of the terminal device, a trajectory of the touch event in the screen region comprises:
receiving the touch event triggered in a current scene image display interface, and recording a trigger position of the touch event, continuous changes of the trigger position of the touch event constituting the trajectory of the touch event.

14. The non-transitory computer-readable storage medium according to claim 12, wherein the position and posture comprise a position of the terminal device in the space coordinate system and an acquisition direction of a camera in the terminal device; and
the generating a virtual model, according to a projection of the trajectory of the touch event in a space coordinate system comprises:
projecting the trajectory of the touch event onto a plane according to the position of the terminal device in the space coordinate system and the acquisition direction of the camera in the terminal device, the plane being located in the acquisition direction of the camera in the terminal device, and a distance from a current position of the terminal device being a preset distance; and
generating the virtual model from the trajectory of the touch event in a projection position of the plane, according to a configured target trajectory style.

15. The non-transitory computer-readable storage medium according to claim 14, wherein the reconstructing a model view of the virtual model mapped within a field of view of the terminal device, according to a position and posture of the terminal device in the space coordinate system comprises:
reconstructing the field of view of the terminal device in the space coordinate system, according to the position of the terminal device in the space coordinate system and the acquisition direction of the camera in the terminal device; and
mapping the virtual model within the field of view to a display region of the terminal device to obtain the model view.

16. The non-transitory computer-readable storage medium according to claim 12, wherein the overlaying a scene image acquired by the terminal device in the position and posture with the model view to obtain a personalized scene image comprises:
using a scene image acquired by the terminal device in the position and posture as a background, and overlaying the scene with the model view to obtain the personalized scene image.

\* \* \* \* \*